April 21, 1936.   T. E. FERREN   2,037,971
LOCK FOR BOOMERS, CHAIN HOOKS AND THE LIKE
Filed May 7, 1935
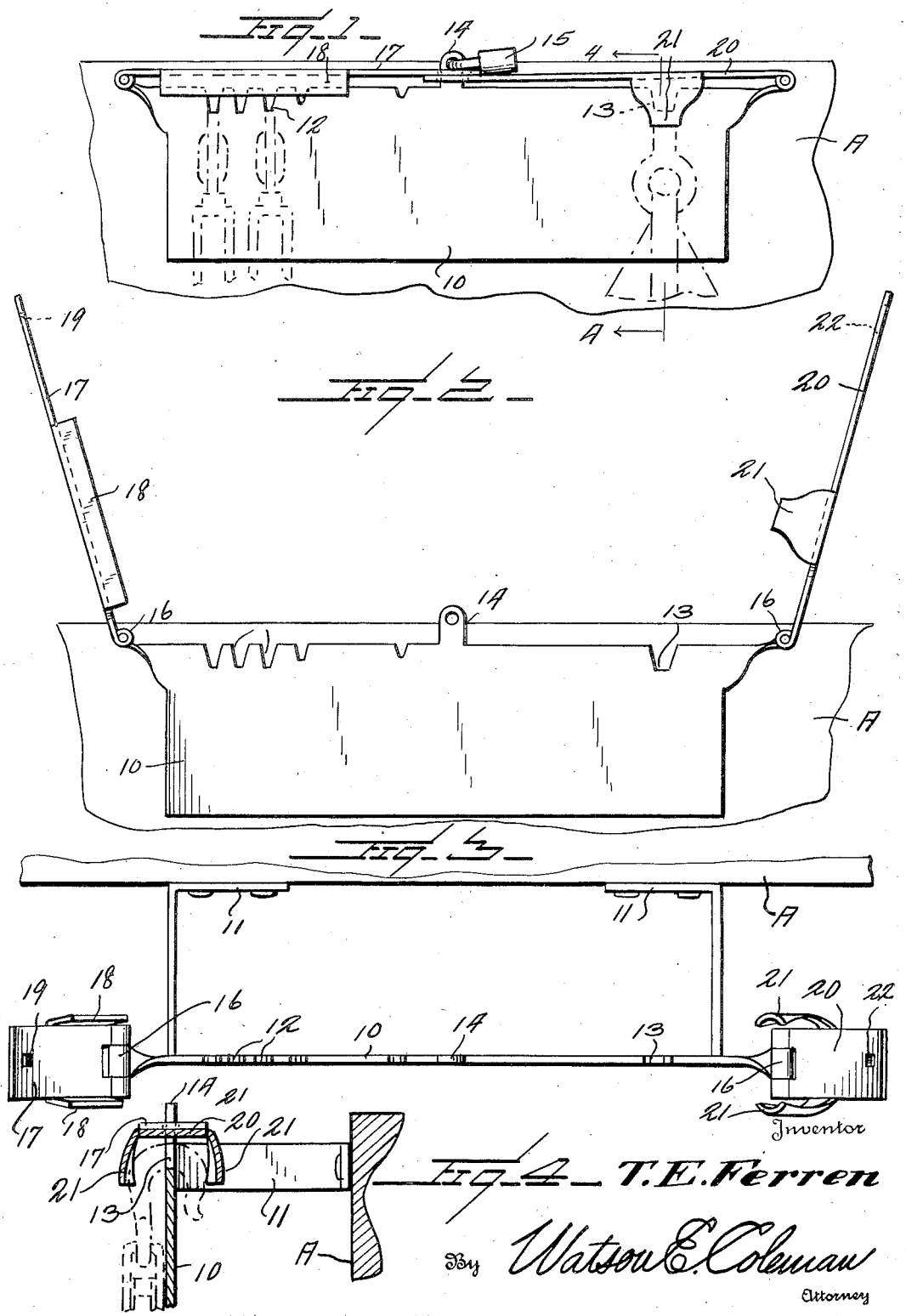

Patented Apr. 21, 1936

2,037,971

UNITED STATES PATENT OFFICE 2,037,971

LOCK FOR BOOMERS, CHAIN HOOKS, AND THE LIKE

Ted E. Ferren, Shamrock, Okla.

Application May 7, 1935, Serial No. 20,277

3 Claims. (Cl. 70—14)

This invention relates to devices used in oil well drilling and operating, and particularly to means adapted to be applied on a truck or to form part thereof whereby certain articles may be locked in place upon the truck to prevent their theft or accidental loss, and which is so constructed that when desired, the articles may be supported in convenient position for detachment and use.

The general object of my invention is to provide a locking device of this character adapted to be mounted upon the side of a truck and support chains with their hooks, boomers, pulleys and the like, and my device being formed with a bar having notches for receiving these various hooks or like parts and with pivoted clamping bars, which when turned down over the hooks or like articles, will prevent their detachment from the first named bar, a lock being provided whereby the second named bar or bars may be locked in place.

My invention is illustrated in the accompanying drawing wherein:

Figure 1 is a front elevation of my device with the locking members closed;

Figure 2 is a like view of Figure 1 with the locking members open:

Figure 3 is a top plan view of the structure as shown in Figure 2;

Figure 4 is a section on the line 4—4 of Figure 1.

Referring to the drawing, 10 designates a relatively wide bar supported in parallel relation to the side wall of the truck body A by means of angular brackets 11. These brackets are rigidly attached to the bar 10 so that they cannot become detached therefrom and are bolted, riveted, welded or otherwise attached to the truck body A. Thus if the truck body is of metal, the brackets may be welded thereto, but if of wood, the brackets should be bolted or riveted thereto.

The bar 10 is approximately a foot wide in actual use and may be of any desired length, and the upper edge of this bar is disposed slightly below the bed of the truck. The upper edge of this bar 10 is provided with a plurality of notches 12 disposed nearer one side of the bar than the other, and these notches may be of uniform depth or of varying depths to accommodate the hooks of different articles.

The opposite end of the bar may be provided on its upper edge with one or more relatively deep U-shaped notches, one of which is shown and designated 13. The upper edge of the bar is also provided with an upwardly extending keeper 14 which is apertured for the passage of the shank of a padlock 15. The ends of the bar are formed with knuckles 16 and pivoted to one of these knuckles is a locking bar 17 having the laterally extending wings 18. The bar 17 with its wings constitutes a hood and when this hood is turned downward into parallel relation to the upper edge of the supporting bar 10, the wings 18 extend down on each side of the upper edge of the locking bar. The free extremity of the locking bar 17 is provided with an aperture 19 adapted to receive the keeper 14. To the opposite end of the bar 13 there is hinged, by the hinge 16, the locking bar 20 provided on its opposite margins with the downwardly extending transversely curved and somewhat tapered hoods or lugs 21. When this locking bar 20 is turned down over the edge of the supporting bar 10, these members 21 extend downward on each side of the notch 13. If there is more than one notch 13, there will be a corresponding number of these members 21. The free end of the locking bar 20 is apertured for the passage of the keeper 14, as at 22.

It will be seen that the locking bar 20 with the members 21 constitute a hood in the same sense that the member 17 with the flanges 18 constitutes a hood, and that when these members 17 and 20 are turned downward against the edge of the supporting bar 10 that any hooks or like elements disposed within the notches 12 and 13 will be locked in place and cannot be either accidentally or intentionally removed until the padlock 15 is released and the members 17 and 20 raised.

The notch 13 is intended for the reception of the hook of a block. The hooks of the "boomers" will be disposed in certain of the notches 12 and the hooks of chains will also be disposed in certain of the notches 12. It is to be understood that this device may be of any desired length to accommodate any number of boomer hooks, pulley hooks or chain hooks or like articles, because an oil field truck is ordinarily equipped with about eight boomers, seven chains and three blocks. Therefore, the construction shown in the drawing is merely illustrative of the principle of my structure.

It will be seen that the members 21 partially embrace opposite sides of the big hooks used on the pulleys, boomers, etc., so as to prevent any possibility of the hooks being slid out without releasing the locking members 17 and 20, and that the like function is performed by the flanges 18 which prevent the smaller hooks being pulled out of the notches 12. By making the bar 10 relatively wide, the tools are kept from swinging when the truck is in motion.

It will be seen that I have provided a device which is readily applicable to work trucks, and which will lock these pulleys, chains, boomers, etc. in place where the workman may have convenient access to them, which device prevents these articles from being stolen, lost or mislaid, and prevents the hooks of these articles from being slipped out of the corresponding notches.

The extension on plate 10 is to prevent the block boomers, pulleys, chains, etc. from swinging under the truck and working out of the notches. This plate prevents the blocks from swinging as it may be made as wide as the blocks are long.

It will be obvious that the device may be of any desired length and be notched to accommodate any desired number of the various articles shown.

What is claimed is:—

1. A device of the character described, including a supporting bar, brackets extending from the bar and adapted to support the bar in parallel relation to the side of a truck, the upper edge of the supporting bar being provided with a plurality of notches and with an upwardly extending keeper, locking bars hinged to the ends of the supporting bar for swinging movement in a vertical plane and adapted to be turned into a position parallel to and in proximity with the upper edge of the supporting bar and having at their free ends apertures through which the keeper may pass whereby the locking bars may be locked in closed position, the locking bars having hoods projecting outward from their faces and adapted to extend downward on each side of the supporting bar opposite said notches when the locking bars are closed.

2. A device of the character described, comprising a supporting bar, having means whereby it may be attached to the side of a truck and be disposed in parallel relation with the side, the upper edge of the supporting bar being provided with notches, certain of the notches being disposed between the middle of the supporting bar and one end thereof and being V-shaped, the upper portion of the supporting bar at its upper edge and between the middle of the bar and the end thereof being provided with a U-shaped notch and locking bars hinged to the ends of the supporting bar for swinging movement in a vertical plane into or out of parallel relation to the upper edge of the supporting bar, one of said locking bars having opposed flanges adapted, when the locking bar is closed, to extend downward opposite the first named notches, the other locking bar having a pair of lugs opposed to each other, the lugs being transversely curved and adapted, when the locking bar is closed, to be disposed on each side of the U-shaped notch, the ends of the locking bars having slots and the supporting bar having a keeper coacting with the slots whereby the locking bars may be locked in parallel position to the upper edge of the supporting bar.

3. Means for securing tools, comprising a flat bar adapted to be mounted horizontally and with an upwardly directed longitudinal edge, said edge being adapted to have a tool engaged thereover, a locking bar, means for securing said locking bar over and substantially parallel with said edge of the first bar, and a pair of hood elements extending from opposite sides of said locking bar adapted to receive the first bar therebetween and in spaced relation therewith to cover a tool thereon, each of said elements having the side facing the other element recessed to receive a portion of the tool.

TED E. FERREN.